United States Patent
Bank et al.

(10) Patent No.: US 9,288,244 B2
(45) Date of Patent: Mar. 15, 2016

(54) MANAGING A COLLABORATIVE SPACE

(71) Applicant: International Business Machines Corporation, Armonk, NY (US)

(72) Inventors: Judith H. Bank, Cary, NC (US); Liam Harpur, Dublin (IE); Ruthie D. Lyle, Durham, NC (US); Patrick J. O'Sullivan, Dublin (IE); Lin Sun, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 282 days.

(21) Appl. No.: 13/960,271

(22) Filed: Aug. 6, 2013

(65) Prior Publication Data
US 2015/0046527 A1 Feb. 12, 2015

(51) Int. Cl.
*G06F 15/16* (2006.01)
*H04L 29/06* (2006.01)

(52) U.S. Cl.
CPC .................. *H04L 65/4053* (2013.01)

(58) Field of Classification Search
CPC   H04L 65/403;  H04L 12/1822;  G06Q 10/109; G06Q 10/10;  G06Q 30/02
See application file for complete search history.

(56) References Cited

U.S. PATENT DOCUMENTS

| | | | |
|---|---|---|---|
| 5,983,214 A * | 11/1999 | Lang et al. | |
| 6,513,059 B1 * | 1/2003 | Gupta et al. | 709/202 |
| 2002/0161688 A1 * | 10/2002 | Stewart et al. | 705/37 |
| 2003/0135565 A1 * | 7/2003 | Estrada | 709/206 |
| 2007/0124373 A1 * | 5/2007 | Chatterjee et al. | 709/204 |
| 2008/0126481 A1 | 5/2008 | Chakra et al. | |
| 2008/0294482 A1 * | 11/2008 | Bank et al. | 705/8 |
| 2009/0157466 A1 * | 6/2009 | Bank et al. | 705/9 |
| 2009/0171904 A1 * | 7/2009 | O'Sullivan et al. | 707/3 |
| 2010/0198648 A1 * | 8/2010 | Bank et al. | 705/9 |
| 2011/0087688 A1 * | 4/2011 | Midtun et al. | 707/769 |
| 2012/0005114 A1 * | 1/2012 | Bank et al. | 705/347 |
| 2012/0054645 A1 | 3/2012 | Hoomani et al. | |
| 2012/0096385 A1 * | 4/2012 | Bank et al. | 715/772 |

OTHER PUBLICATIONS

Disclosed Anonymously, "Tailored Content Checking for a Recipient in an Electronic Communication System", IP.com, IPCOM000218129D, May 23, 2012.

* cited by examiner

*Primary Examiner* — Peling Shaw
(74) *Attorney, Agent, or Firm* — Steven L. Nichols; Fabian Vancott

(57) ABSTRACT

Managing a collaborative space includes providing a collaborative space in which a number of users collaborate from respective client devices, monitoring content of the collaborative space to determine a context of collaboration in the collaborative space, and changing an operation of at least one functionality of the collaborative space based on the determined context of collaboration in the collaborative space.

20 Claims, 6 Drawing Sheets

MANAGING A COLLABORATIVE SPACE

The present invention relates to managing a collaborative space, and more specifically, to managing a collaborative space based on a context of the collaboration within the collaborative space.

Users within businesses and other organizations regularly communicate with a number of other users within the business or organization. With the expansion of many organizations (globally in some instances), users within an organization may be from different cultures, departments, and physical localities. For example, an employee in the sales department may send an email message to an employee in the service department. In another example, a manager in the United States may send an email message to a manager in England. As such collaborative spaces are used to facilitate communication among a community of users.

BRIEF SUMMARY

A system for managing a collaborative space includes a provide engine to provide a collaborative space in which a number of users collaborate from respective client devices, a monitor engine to monitor content of collaborative space to determine a context of collaboration in the collaborative space, and a change engine to change an operation of at least one functionality of the collaborative space based on the determined context of collaboration in the collaborative space.

A system for managing a collaborative space includes a monitor engine to monitor content of the collaborative space to determine a context of collaboration in the collaborative space, a receive engine to receive content information for the collaborative space, and a change engine to change an operation of at least one functionality of the collaborative space based on the received context information.

A computer program product for managing a collaborative space includes a computer readable storage medium that includes computer usable program code embodied therewith. The computer usable program code includes computer usable program code to, when executed by a processor, identify, within the collaborative space, a recipient of a message, obtain recipient context information, and change an operation of at least one functionality of the collaborative space based on the obtained recipient context information.

A method for managing a collaborative space includes providing a collaborative space in which a number of users collaborate from respective client devices, monitoring content of collaborative space to determine a context of collaboration in the collaborative space, and changing an operation of at least one functionality of the collaborative space based on the determined context of collaboration in the collaborative space.

A method for managing a collaborative space includes identifying, within a collaborative space, a recipient of a message, obtaining recipient context information, and changing an operation of at least one functionality of the collaborative space based on the obtained recipient context information.

A method for managing a collaborative space includes monitoring content of the collaborative space to determine a context of collaboration in the collaborative space, receiving context information for the collaborative space, and changing an operation of at least one functionality of the collaborative space based on the received context information.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
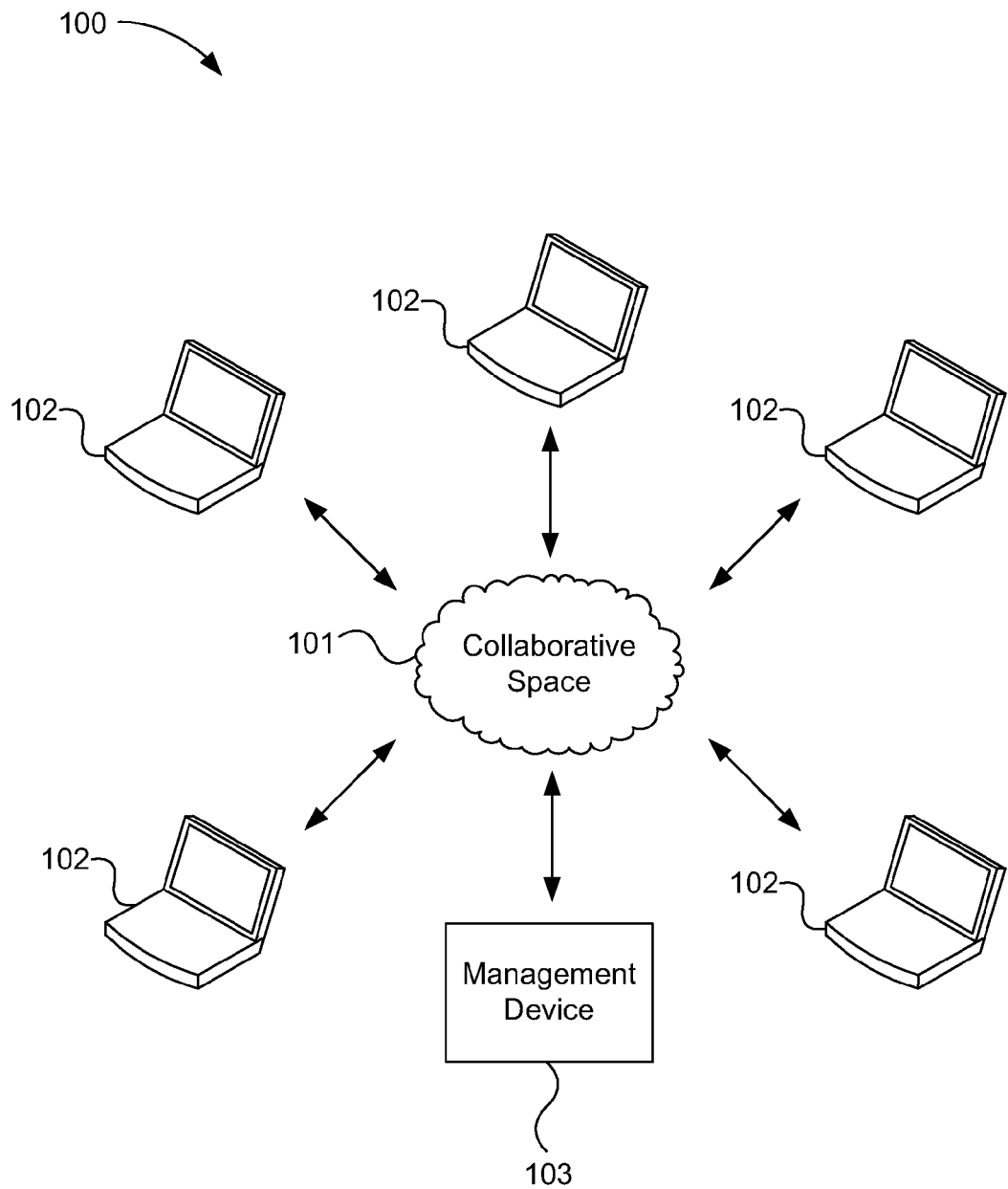
FIG. 1 is a diagram of an example of a system for managing a collaborative space, according to one example of principles described herein.

The present specification describes a system and a method for managing a collaborative space based on the context of the collaboration such that the content of the collaborative space is tailored to the collaborative space. As described above, collaborative communication in the complex infrastructure of a large organization may span multiple departments, geographical locations and cultures. Accordingly, communication between users of an organization may include different syntax conventions, formats, and other communication norms from multiple cultures, departments, and physical localities. For example, different countries spell words differently, and may implement different date, currency, and time formats. As a result, some information may be lost or miscommunicated based on the different communication norms and syntax conventions that are present in a collaborative space.

Thus, the present disclosure describes a method and system for managing a collaborative space. Specifically, the present disclosure describes a method and system for managing a collaborative space based on the content and context of the collaborative space. A collaborative space may be provided in which a number of users collaborate from respective client devices. The content of the collaborative space may be monitored to determine a context of the collaboration in the collaborative space. An operation of at least one functionality of the collaborative space may be changed based on the determined context of the collaboration. For example, within the collaborative space, a recipient of a message may be identified. Context information for the recipient may then be obtained. Based on the recipient context information an operation of at least one functionality of the collaborative space may then be changed.

A system and method for updating the context is also described. For example, as described above, the content of a collaborative space may be monitored to determine a context of the collaboration in the collaborative space. Context information for content of the collaborative space may then be received. Based on the received content information, the context of the collaboration may be updated.

A collaborative space may be a grouping of electronic devices that facilitate communication between a group of users. Content may be any information exchanged between users in a collaborative space. Examples of content include, email messages, text messages, and attached documents, among other communication methods. Context may be as any information identifying the context of the content, the collaborative space, or a combination thereof. Examples of context include language preferences, location preferences, geographic syntax conventions, and other contextual information. "A number of" or similar language may be any positive number comprising 1 to infinity; zero not being a number, but the absence of a number.

As will be appreciated by one skilled in the art, aspects of the present specification may be embodied as a system, method, or computer program product. Accordingly, aspects of the present specification may take the form of hardware or a combination of hardware and software. Furthermore, aspects of the present specification my take the form of a computer program product embodied in a number of computer readable mediums having computer readable program code embodied thereon.

Any combination of computer readable medium(s) may be utilized. A computer readable storage medium may be, for example, but not limited to, an electronic, magnetic, optical electromagnetic, infrared, or semiconductor system, apparatus, or device or any suitable combination of the foregoing. More specific examples (a non-exhaustive list) of the computer readable mediums would include the following: an electrical connection having a number of wires, a portable computer diskette, a hard disk, a random access memory (RAM), a read-only memory (ROM), an erasable programmable read-only memory (EPROP or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain, or store a program for use by or in connection with any instruction execution system, apparatus, or device such as, for example, a processor.

Program code embodied on a computer readable medium may be transmitted using any appropriate medium, including but not limited to wireless, wire line, optical fiber cable, RF, etc., or any suitable combination of the foregoing.

Computer program code for carrying out operations of the present specification may be written in an object oriented programming language such as Java, Smalltalk, or C++, among others. However, the computer program code for carrying out operations of the present systems and methods may also be written in procedural programming languages, such as, for example, the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, thought the internet using an internet service provider).

Flowchart illustrations and/or block diagrams of methods, apparatus, and computer program products are disclosed. Each block of the flowchart illustrations and/or block diagrams, and combinations of blocks in the flowchart illustrations and/or block diagrams, can be implemented by computer program instructions. These computer program instructions may be provided to a processor or other programmable data processing apparatus to produce a machine, such that the instructions, which execute via a processor of the computer or other programmable data processing apparatus, implement the functions/acts specified in the flowchart and/or block diagram block or blocks.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

In one example, these computer program instructions may be stored in a computer-readable memory that can direct a computer or other programmable data processing apparatus to function in a particular manner, such that the instructions stored in the computer-readable memory produce an article of manufacture including instructions which implement the functions/act specified in the flowchart and/or block diagram blocks or blocks.

The computer program instructions may also be loaded onto a computer or other programmable data processing apparatus to cause a series of operations to be performed on the computer or other programmable apparatus to produce a computer implement process such that the instructions which execute on the computer or other programmable apparatus implement the functions/acts specified in the flowchart and/or block diagram blocks or blocks.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system (100) for managing a collaborative space (101), according to one example of principles described herein. As mentioned above, a collaborative space (101) may be a forum that facilitates many users communicating with one another. For example, a user within a business organization may send an email message to one or more other users of the business organization via the collaborative space (101). The communications transmitted and received between users of the collaborative space (101) may be referred to as the collaborative space (101) content, the content of collaboration, or similar terminology. The content may be any form of communication between users of the collaborative space (101). Examples of content include, email messages, text messages, word processing documents, recorded conversations, or other forms of electronic communication. As will be described below, the content of the collaborative space (101) may be monitored and a context of the collaboration of the collaborative space (101) may be determined based on the content.

The collaborative space (101) may also be defined by a number of functionalities that control the communications in the collaborative space (101). For example, a type ahead functionality may make word suggestions for a communication. In another example, a spell check functionality may identify misspelled words and suggest a correction. Other examples of functionalities include a markup functionality to identify certain words or phrases of a communication, an object reference functionality to identify object references in a communication, a rules functionality to impose communication rules to a communication, among other communication control functionalities.

The collaborative space (101) may be defined by a context of the collaborative space (101). As used herein, context may refer to information that describes the characteristics of a communication in the collaborative space (101). For example, the context may indicate the locations of the users of the collaborative space (101). The context may also indicate the language preferences of the users of the collaborative space (101). Other examples of context include syntax conventions, language format, and group memberships. For example, the location of senders and recipients of email communications may define, at least in part, the collaborative space (101).

The users of the collaborative space (101) may communicate with one another via a number of client devices (102). Examples of client devices (102) include desktop computers, laptop computers, smart phones, personal digital assistants (PDAs), and tablets, among other electronic devices. In other words, a client device (102) may be any electronic device that allows a user to communicate with another electronic device. In some examples, the client devices (102) may provide information used to update the context of the collaborative space (101). For example, the client device (102) may indicate a language preference or a location of a user of a client device (102). Accordingly, the context of the collaborative space (101) may be defined, at least in part, by the language preference or location indicated by the client device (102). As will be described below, at least one functionality of the collaborative space (101) may be changed based on the context information indicated by the client device (102).

Lastly, a management device (103) may manage the collaborative space (101). More specifically, the management device (103) may monitor the content of the collaborative space (101) and may change an operation of at least one functionality of the collaborative space (101). For example, the management device (103) may store, reference, or otherwise receive the content of the collaborative space (101). The management device (103) may analyze the content to determine a context of the collaborative space (101). For example the management device (103) may determine the geographical localities, language preferences, syntax conventions, and other context of the content of the collaborative space (101). Based on the context, the management device (103) may change at least one functionality of the collaborative space (101). For example, as will be described in detail below, the management device (103) may change a spell check dictionary based on the context (i.e., language preference) of the client devices (102). Other examples of functionalities that may be changed include a type ahead functionality, a markup functionality, a rules functionality, and an object reference functionality among other collaborative space (101) functionalities.

Using a management device (103) to monitor and change the functionality of the collaborative space (101) based on the content of the collaboration may be beneficial in that it may leverage the context of the collaborative space (101) to intelligently govern the functionalities of the collaborative space (101) such that the functionalities are no longer generically enabled, but are customizable based on the context of the collaborative space (101).

Figure 2:
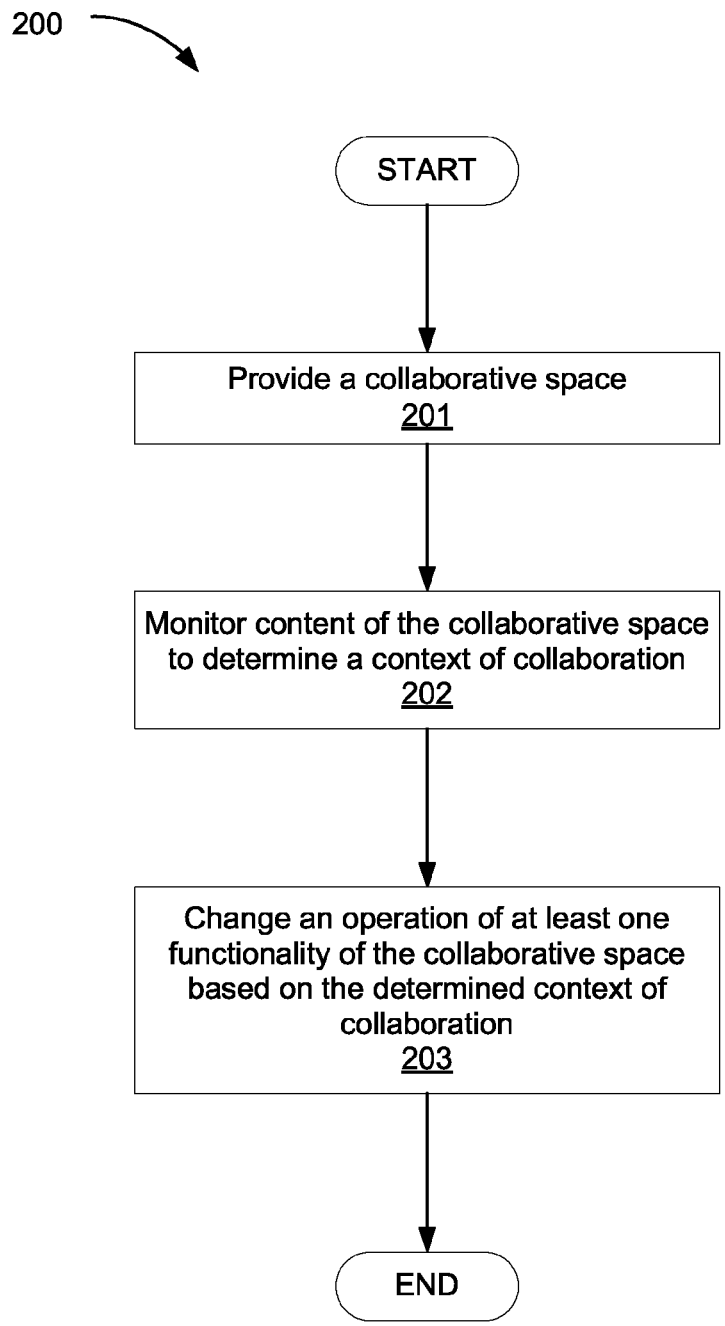
FIG. 2 is a flowchart of an example of a method for managing a collaborative space, according to one example of principles described herein.

FIG. 2 is a flowchart of an example of a method (200) for managing a collaborative space (101), according to one example of principles described herein. In some examples, the method (200) may be performed by the management device (FIG. 1, 103). The management device (FIG. 1, 103) may provide (201) a collaborative space (FIG. 1, 101) in which a number of users can collaborate from respective client devices (FIG. 1, 102). For example, the management device (FIG. 1, 103) may be a network server that provides an internal email system that allows users, via client devices (FIG. 1, 102), to communicate with one another via email. Similarly, the network server may provide other forms of communication between users of the collaborative space (FIG. 1, 101).

The management device (FIG. 1, 103) may monitor (202) the content of the collaborative space to determine a context of the collaboration in the collaborative space (FIG. 1, 101). As described above, the content of the collaborative space (FIG. 1, 101) may include the different communications between the various users of the collaborative space (FIG. 1, 102). For example, the content may include email messages, text messages, and word processing documents shared between users in a business organization. Accordingly, the management device (FIG. 1, 103) may monitor the communications between the various users. The management device (FIG. 1, 103) may implement any number of techniques to monitor the content of the collaborative space (FIG. 1, 101). For example, the management device (FIG. 1, 103) may analyze the words of the communications, or metadata relating to the communications, to determine a context of the collaboration. The context of the collaboration may include information such as the language preference, group membership, locality preferences, syntax conventions, of the users of the collaborative space (FIG. 1, 101).

The management device (FIG. 1, 103) may change (203) an operation of at least one functionality of the collaborative space (FIG. 1, 101) based on the determined context of collaboration in the collaborative space (FIG. 1, 101). For example, if the management device (FIG. 1, 103) determines a recipient of an email message has a French language preference, the management device (FIG. 1, 103) may change a spell check functionality and a grammar check functionality of the collaborative space (FIG. 1, 103) to use a French dictionary for that email message.

The management device (FIG. 1, 103) may change a type ahead functionality of the collaborative space (FIG. 1, 101). A type ahead functionality may suggest a word based on a few entered letters of a word. For example, a user may have typed the letters "co." In this example, if the management device (FIG. 1, 103) determines that the recipient of the message is in England, the type ahead functionality may be changed to suggest the word "colour." By comparison, if the management device (FIG. 1, 103) determines that the recipient of the message is in the United States, the type ahead functionality may be changed to suggest the word "color." In yet another example, if the context of the collaborative space (FIG. 1, 101) indicates a particular word is used often, for example, a technical term used in an engineering department, the type ahead functionality may suggest that particular word based on the entry of a few letters of the word.

The management device (FIG. 1, 103) may change an object reference functionality in the collaborative space (FIG. 1, 103). For example, if the management device (FIG. 1, 103) determines that the recipient of a message is a sales representative, the management device (FIG. 1, 103) may change an object reference from an internal description of a product to a formal name of the product. By comparison, if the recipient of a message is a research and development engineer, the management device (FIG. 1, 103) may change a product reference to a code name. In another example, changing an object reference functionality may comprise suggesting changes. For example, in the example given above, if the recipient of a message is a sales representative, the management device (FIG. 1, 103) may suggest to the sender of the message (via a popup notification, for example) to change the internal description of a product to a formal name of the product.

In yet another example, the management device (FIG. 1, 103) may change a markup functionality of the collaborative space (FIG. 1, 101). For example, the management device (FIG. 1, 103) may make the color red unavailable as a highlighting color, or as a text color option, when a collaborative space (FIG. 1, 101) has a large number of Chinese documents or when the recipient of a message has a Chinese syntax preference indicated.

In still another example, the management device (FIG. 1, 103) may change a library functionality of the collaborative space (FIG. 1, 101). For example, within a particular department of an organization, certain technical terms and acronyms may be used repeatedly. If the management device (FIG. 1, 103) determines that the recipient of a message is not part of that department, and accordingly may not be familiar with the terms and acronyms, the management device (FIG. 1, 103) may spell out the acronym, or define the technical term. In some examples, the management device (FIG. 1, 103) may generate an alert that directs the user to spell out the acronym or to define the technical term. In another example, changing a library functionality may comprise suggesting changes. For example, in the example given above, if the recipient of a message is from a different department than the sender of the message, the management device (FIG. 1, 103) may suggest to the sender of the message (via a popup notification, for example) to spell out an acronym or to define a technical term.

Another example of changing a functionality may include imposing a collaborative space (FIG. 1, 101) rule. For example, the management device (FIG. 1, 103) may impose a rule that indicates that a customer should be referred to as a "patron" rather than a "user" or a "client." In another example, a rule may indicate that "sales employees" should be referred to as "design consultants" instead of "salesmen."

In some examples, the monitoring (202) of the content and the changing (203) of the operation of the functionality may be based on a request. For example, the management device (FIG. 1, 103) may monitor content and change functionalities when a user selects an option to do so. By comparison, the management device (FIG. 1, 103) my avoid monitoring (202) the content and changing (203) an operation if a request has not been received.

Changing the operation of at least one functionality of the collaborative space (FIG. 1, 101) based on determined context may be beneficial in that it ties the functionalities to the context of the collaborative space (FIG. 1, 101) rather than a general application of the functionalities. In other words, the functionalities are more tailored to the particular content of a collaborative space (FIG. 1, 101). This may allow a recipient to receive a suitable message without having to attempt additional processing work when compared to a general application which may result in lost information or miscommunications.

Figure 3:
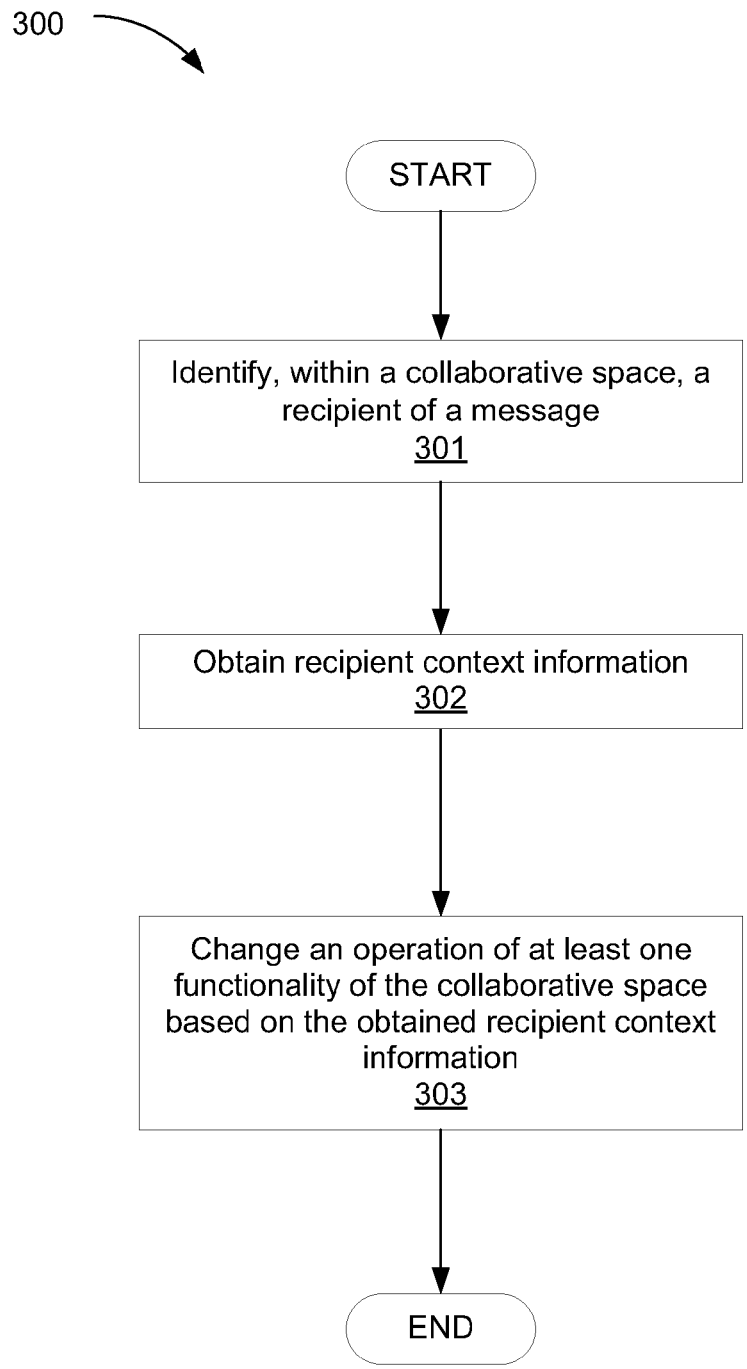
FIG. 3 is a flowchart of an example of a method for managing a collaborative space, according to one example of principles described herein.

FIG. 3 is a flowchart of an example of a method (300) for managing a collaborative space (FIG. 1, 103), according to one example of principles described herein. The method (300) may be performed by the management device (FIG. 1, 103). According to the method (300), a message may be modified at the sender's end of communication such that the message is tailored for the recipient. For example, the spelling, text format, acronyms, and other syntax conventions may be based on the recipient's preferences and may be applied while the sender is composing the message.

The management device (FIG. 1, 103) may identify (301) a recipient of a message within a collaborative space (FIG. 1, 101). For example, a user "Adam" may compose an email message to another user "Bob" using the email bob@us.example.com. From Bob's email address in the "To;" field of the email composer, the management device (FIG. 1, 103) may identify (301) Bob as the recipient of the message.

The management device (FIG. 1, 103) also may obtain (302) recipient context information. As described above, context information may comprise information that indicates the characteristics of the collaboration. For example, the recipient context information may indicate what groups the recipient is a member of. For example, the recipient context information may indicate that the recipient is a member of the sales department. An individual may be a member in a number of groups. For example, an engineering manager may be a member of a product development group and a manufacturing group. In other examples, the recipient context information may indicate language preferences, locality preferences, syntax conventions, or combinations thereof, of the message recipient.

In some examples, obtaining (302) recipient context information may include gathering recipient context information from a repository. For example, the management device (FIG. 1, 103) may maintain a directory listing users and corresponding user information. Examples of user information may include phone number, residence address, and department affiliations, among other types of information. From this repository, the management device (FIG. 1, 103) may gather recipient context information.

In another example, obtaining (302) recipient context information may include inferring recipient context information. For example, the management device (FIG. 1, 103) may infer a recipient's geographic location based on the domain name of the recipient's email address (an email included in a repository, or as entered by the sender when creating the email message for example). In another example, the management device (FIG. 1, 103) may infer a recipient's geographic location based on an area code in a phone number.

In yet another example, obtaining (302) the recipient context information may comprise receiving input from a user. For example, a sender may manually enter the geographic location of the user (either while composing the email message or while populating a repository). Similarly, a sender may manually enter a list of groups of which the recipient is a member of during the composition of the message.

Based on the obtained recipient context information, the management device (FIG. 1, 103) may change (303) an operation of at least one functionality of the collaborative space (FIG. 1, 101) based on the obtained recipient context information. In some examples changing (303) an operation of at least one functionality of the collaborative space (FIG. 1, 101) based on the obtained recipient context information may be similar to changing (203) an operation of at least one functionality of the collaborative space (FIG. 1, 101) based on the determined context of collaboration. For example, based on the recipient context information, the management device (FIG. 1, 103) may change a type ahead functionality, a spell check functionality, a markup functionality, an object reference functionality, a library functionality, a collaborative space rule functionality, among other collaborative space (FIG. 1, 101) functionalities as described in connection with FIG. 2.

An example of obtaining (302) recipient context information and changing (303) an operation of at least one functionality of the collaborative space (FIG. 1, 101) based on the obtained recipient context information is given as follows. A user "Adam" with the email address adam@uk.example.com. Adam may be a British English speaker, currently residing in the United Kingdom, who is working at example.com. Adam may be composing a message to a new contact "Bob" with the email address bob@us.example.com. Bob may be an American English speaker, currently residing in the United States, who is also working at example.com. In the message to Bob, Adam may refer to the date "10/04/12" (meaning Apr. 10, 2012 in the international format), the time "2:30 pm," the word "colour," and the acronym "TCCS."

In this example, the management device (FIG. 1, 103) may obtain (302) recipient context information indicating that Bob is in the same department as Adam. In this example, the management device (FIG. 1, 103) may change the date format functionality by changing the date "10/04/12" to "04/10/12" to conform with the United States format as used by Bob. In another example, the management device (FIG. 1, 103) may change the date "10/04/12" to another format that clearly indicates Apr. 10, 2012. In another example, rather than automatically changing the date format, the management device (FIG. 1, 103) may change the date format functionality to suggest that the user change the date format.

Additionally, in this example, the management device (FIG. 1, 103) may change the time functionality by changing the time "2:30 pm" to "2:30 pm GMT (9:30 EST)" having checked on example.com's directory to find what time zone Bob uses. In another example, rather than automatically changing the time format, the management device (FIG. 1, 103) may change the time format functionality to suggest that the user change the time format.

Further, in this example, the spell check functionality may indicate an incorrect spelling of the word "colour" and suggest the word "color" to conform with the Bob's context information indicating a locality of the United States. Lastly, the management device (FIG. 1, 103) may maintain the acronym "TCCS" on account of Adam and Bob being in the same department.

In another example, Adam may be composing the same message to a new contact "Charlie" with the email address charlie@somewhere_else.co.uk. Based on this e-mail address, the management device (FIG. 1, 103) may obtain recipient context information indicating that Charlie is located in the United Kingdom, speaks British English, and is from a different organization. In this example, the management device (FIG. 1, 103) may maintain the date format functionality. Additionally, the management device (FIG. 1, 103) may maintain the time format functionality. The management device (FIG. 1, 103) may also maintain the spell-check functionality based on the British English dictionary. Lastly, the management device (FIG. 1, 103) may define the acronym "TCCS" to "Tailored Content Checking System" on account of Adam and Charlie being in different organizations. In another example, rather than automatically defining the acronym, the management device (FIG. 1, 103) may change the library functionality to suggest that the user define the acronym.

Changing (303) the operation of at least one functionality of the collaborative space (FIG. 1, 101) based on the obtained recipient context information may be beneficial in that it ties the functionalities to the context of the collaborative space (FIG. 1, 101) rather than a general application of the functionalities. In other words, the functionalities are more tailored to the particular content of a collaborative space (FIG. 1, 101). This may allow a recipient to receive a suitable message without having to attempt additional processing work when compared to a general application which may result in lost information or miscommunications.

Figure 4:
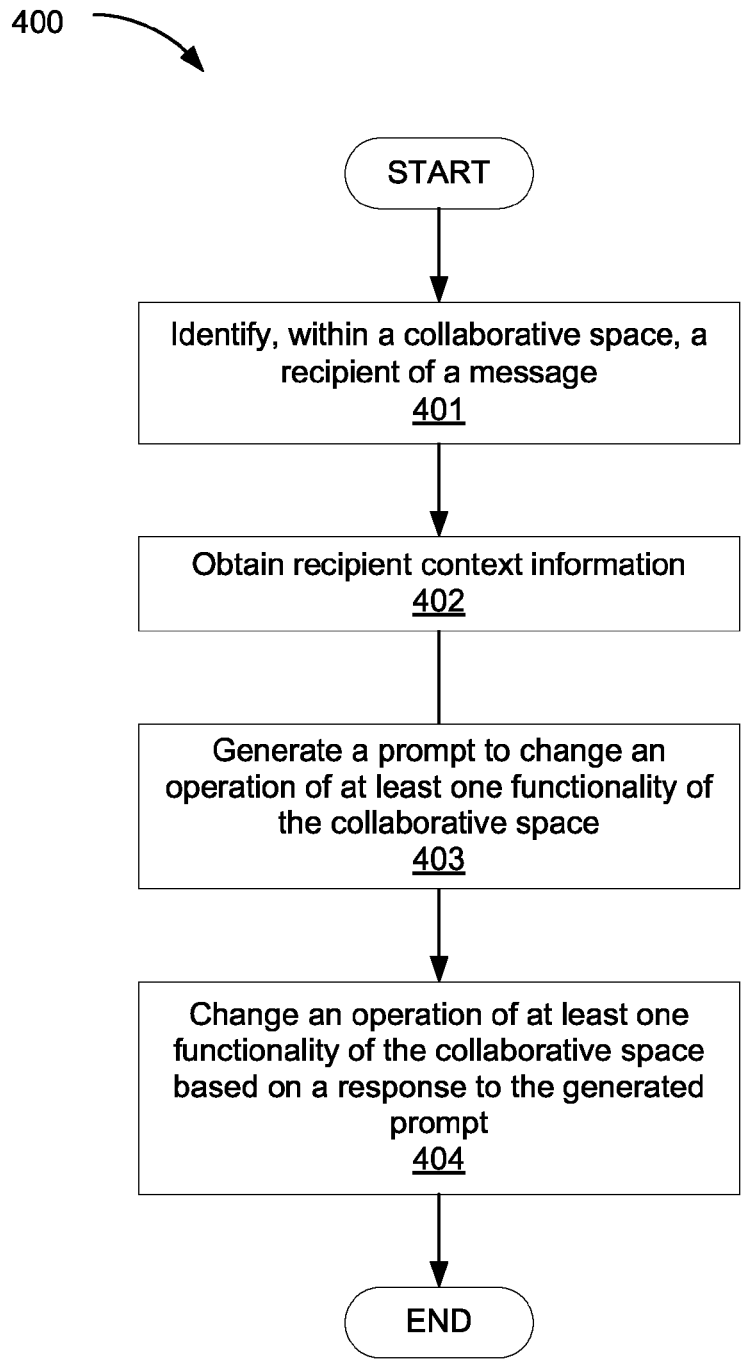
FIG. 4 is a flowchart of an example of a method for managing a collaborative space, according to one example of principles described herein.

FIG. 4 is a flowchart of an example of a method (400) for managing a collaborative space (FIG. 1, 101), according to one example of principles described herein. The method (400) may be performed by the management device (FIG. 1, 103). According to the method (400), a message may be modified at the sender's end of communication such that the message is tailored for the recipient. For example, the spelling, text format, acronyms, and other syntax conventions may be based on the recipient's preferences and may be applied while the sender is composing the message.

The management device (FIG. 1, 103) may identify (401) a recipient of a message within a collaborative space (FIG. 1, 101). In some examples, this may be performed as described in connection with FIG. 3.

The management device (FIG. 1, 103) may obtain (402) recipient context information. In some examples, this may be performed as described in connection with FIG. 3.

The management device (FIG. 1, 103) may generate (403) a prompt to change an operation of at least one functionality of the collaborative space (FIG. 1, 101). For example, if a British employee of a business generates a message to a United States employee of the same business, and the message includes a date written in the international date format, the management device (FIG. 1, 103) may generate (403) a prompt asking whether or not the sender would like to change the date format functionality to the United States date format. The sender may then elect to change the date format or not. In some examples, in addition to generating (403) a prompt to ask whether or not the sender would like to change at least one functionality of the collaborative space (FIG. 1, 101), the management device (FIG. 1, 103) may also generate a suggested correction for the change. Continuing the example above, the management device (FIG. 1, 103) may indicate the United States date format, or another format that clearly indicates the date.

In another example, an engineer employee of a company may compose a message to a recipient and the message may include an acronym. If the management device (FIG. 1, 103) obtains (402) recipient context information indicating that the recipient is not an engineer and may not be familiar with the acronym, the management device (FIG. 1, 103) may generate (403) a prompt directing the engineer employee to define the acronym, spell out the acronym or a combination thereof.

In one example, the prompt may be a pop-up notification during composition of a message. In another example, the prompt may be a pop-up notification after a message is composed, for example, when a "content check" request is made by the sender. While FIG. 4 describes generating (403) a prompt to change a date format functionality and a library functionality, any number of prompts may be generated to change any number of functionalities.

Based on a response to a generated prompt, the management device (FIG. 1, 103) may change (404) an operation of at least one functionality of the collaborative space (FIG. 1, 101). In some examples changing (404) an operation of at least one functionality of the collaborative space (FIG. 1, 101) based on a response to the generated prompt may be similar to changing (203) an operation of at least one functionality of the collaborative space (FIG. 1, 101) based on the determined context of collaboration. For example, based on a response to the generated prompt, the management device (FIG. 1, 103) may change a type ahead functionality, a spell check functionality, a markup functionality, an object reference functionality, a library functionality, a collaborative space rule functionality, among other collaborative space (FIG. 1, 101) functionalities as described in connection with FIG. 2.

Changing (404) the operation of at least one functionality of the collaborative space (FIG. 1, 101) based on a response to the generated prompt may be beneficial in that it ties the functionalities to the context of the collaborative space (FIG. 1, 101) rather than a general application of the functionalities. In other words, the functionalities are more tailored to the particular content of a collaborative space (FIG. 1, 101). This may allow a recipient to receive a suitable message without having to attempt additional processing work when compared to a general application which may result in lost information or miscommunications.

Figure 5:
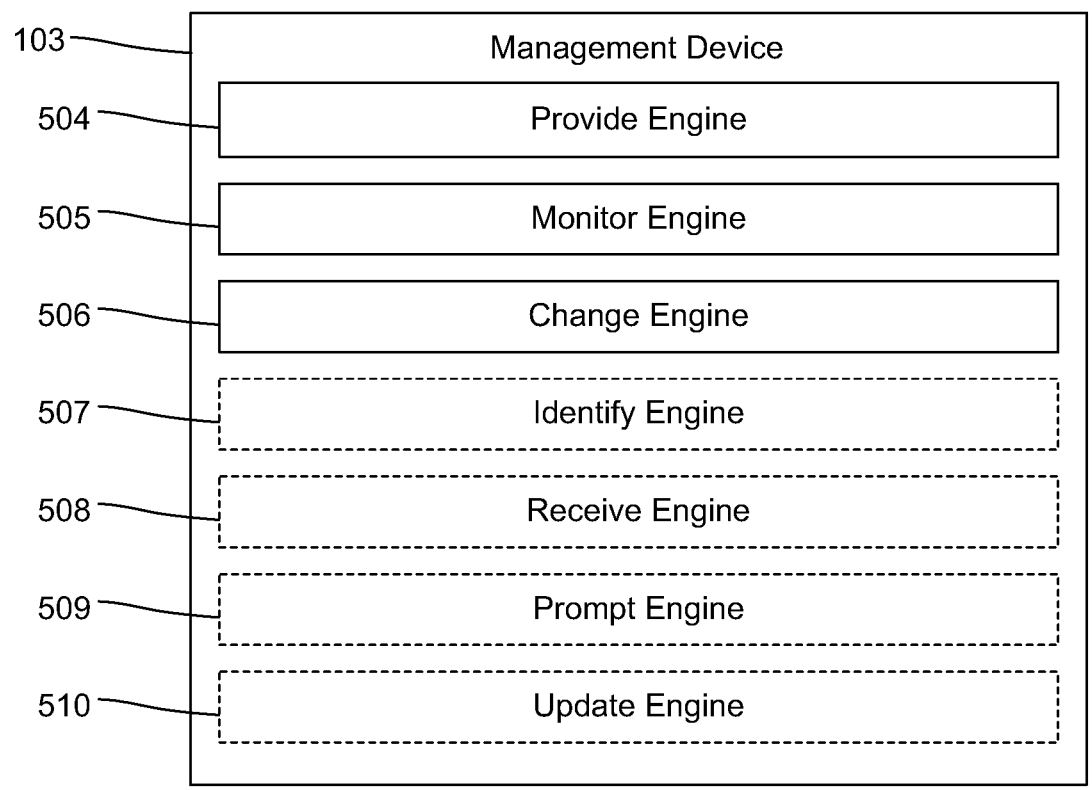
FIG. 5 is a diagram of an example of a management device, according to the principles described herein.

FIG. 5 is a diagram of an example of a management device (103), according to the principles described herein. The management device (103) may include a provide engine (504), a monitor engine (505), and a change engine (506). In this example, the management device (103) may also include an identify engine (507), a receive engine (508), a prompt engine (509), and an update engine (510). The engines (504, 505, 506, 507, 508, 509, 510) refer to a combination of hardware and program instructions to perform a designated function. Each of the engines (504, 505, 506, 507, 508, 509, 510) may include a processor to execute the designated function of the engine.

The provide engine (504) may provide a collaborative space (FIG. 1, 101) in which a number of users collaborate from respective client devices. The monitor engine (505) may monitor the content of the collaborative space (FIG. 1, 101). For example, the monitor engine (505) may search, reference, or otherwise analyze the electronic communications in a collaborative space (FIG. 1, 101). The change engine (506) may change at least one functionality of the collaborative space (FIG. 1, 101). For example, the change engine (506) may change a number of functionalities described herein (in addition to other functionalities) based on a message recipient's context information.

The identify engine (507) may identify an intended recipient of a message being sent in the collaborative space (FIG. 1, 101). The receive engine (508) may receive context information. For example, the receive engine (508) may receive information indicating the language preferences, locality preferences, syntax conventions, and other communication norms for the recipient of the message. The prompt engine (509) may generate a prompt eliciting the user to change at least one functionality of the collaborative space. The prompt engine (509) may also generate a prompt that makes a suggestion for a change to at least one functionality of the collaborative space. The update engine (510) may update the context of the collaborative space (FIG. 1, 101). For example, the update engine (510) may add the received context information to a corpus of context information that defines the collaborative space (FIG. 1, 101).

Figure 6:
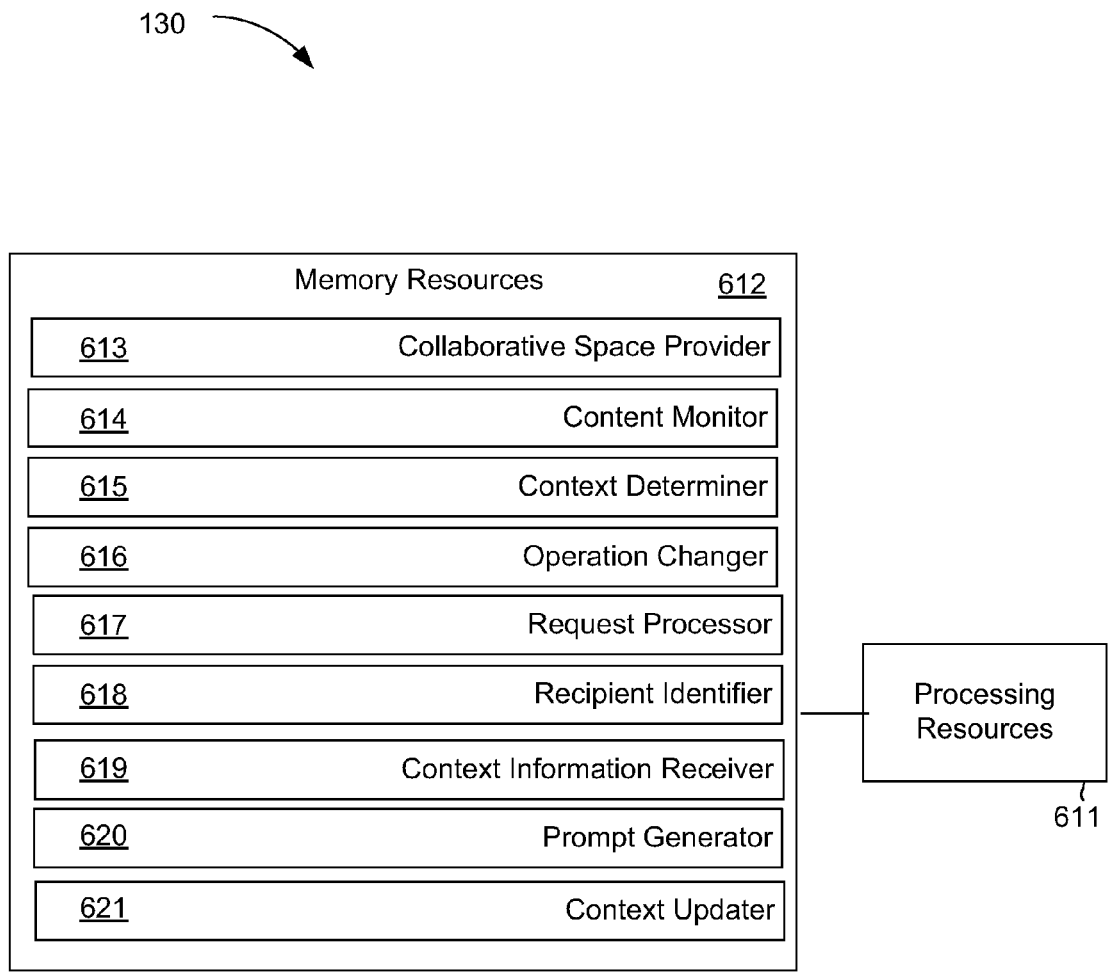
FIG. 6 is a diagram of an example of a management device, according to the principles described herein.

FIG. 6 is a diagram of an example of a management device (103), according to the principles described herein. In this example, the management device (103) may include processing resources (611) that are in communication with memory resources (612). Processing resources (611) may include at least one processor and other resources used to process programmed instructions. The memory resources (612) represent generally any memory capable of storing data such as programmed instructions or data structures used by the management device (103). The programmed instructions shown stored in the memory resources (612) may include a collaborative space provider (613), a content monitor (614), a context determiner (615), an operation changer (616), a request processor (617), a recipient identifier (618), a context information receiver (619), a prompt generator (620), and a context updater (621).

The memory resources (612) include a computer readable storage medium that contains computer readable program code to cause tasks to be executed by the processing resources (611). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The collaborative space provider (613) represents programmed instructions that, when executed, cause the processing resources (611) to provide a collaborative space (FIG. 1, 101) in which a number of users collaborate from respective client devices (FIG. 1, 102). The content monitor (614) represents programmed instructions that, when executed, cause the processing resources (611) to monitor the content of the collaborative space (FIG. 1, 101). The context determiner (615) represents programmed instructions that, when executed, cause the processing resources (611) to determine a context of the collaboration based on the monitored content. The operation changer (616) represents programmed instructions that, when executed, cause the processing resources (611) to change an operation of at least one functionality of the collaborative space (FIG. 1, 101). The request processor (617) represents programmed instructions that, when executed, cause the processing resources (611) to process a request to change an operation of at least one functionality. The recipient identifier (618) represents programmed instructions that, when executed, cause the processing resources (611) to identify a recipient of a message within the collaborative space (FIG. 1, 101). The context information receiver (619) represents programmed instructions that, when executed, cause the processing resources (611) to receive context information for the recipient of a message. The prompt generator (620) represents programmed instructions that, when executed, cause the processing resources (611) to generate a prompt eliciting the user to change at least one functionality of the collaborative space (FIG. 1, 101). The context updater (621) represents programmed instructions that, when executed, cause the processing resources (611) to update the context of the collaborative space (FIG. 1, 101).

Further, the memory resources (612) may be part of an installation package. In response to installing the installation package, the programmed instructions of the memory resources (612) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (611) and the memory resources (612) are located within the same physical component, such as a server, or a network component. The memory resources (612) may be part of the physical component's main memory, caches, registers, non-volatile memory, or elsewhere in the physical component's memory hierarchy. Alternatively, the memory resources (612) may be in communication with the processing resources (611) over a network. Further, the data structures, such as the libraries, may be accessed from a remote location over a network connection while the programmed instructions are located locally. Thus, the management device (103) may be implemented on a user device, on a server, on a collection of servers, or combinations thereof.

The management device (103) of FIG. 6 may be part of a general purpose computer. However, in alternative examples, the management device (103) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A system for managing a collaborative space, comprising:
   a provide engine to provide a collaborative space in which a number of users collaborate from respective client devices;
   a monitor engine to monitor content of the collaborative space to determine a context of collaboration in the collaborative space; and
   a change engine to change an operation of at least one functionality of the collaborative space based on the determined context of collaboration in the collaborative space.

2. The system of claim 1, in which the change engine adapts a type ahead functionality of the collaborative space.

3. The system of claim 2, in which adapting a type ahead functionality of the collaborative space further comprises making suggestions based on the context of the collaboration.

4. The system of claim 1, in which the change engine adapts a spell check functionality of the collaborative space.

5. The system of claim 4, in which adapting a spell check functionality further comprises using a dictionary based on the context of the collaboration.

6. The system of claim 1, in which the change engine adapts a markup functionality of the collaborative space.

7. The system of claim 6, in which adapting a markup functionality further comprises using colors based on the context of the collaboration.

8. The system of claim 1, in which the change engine adapts an object reference functionality in the collaborative space based on the context of the collaboration.

9. The system of claim 1, in which the change engine adapts a library functionality in the collaborative space based on the context of the collaboration.

10. The system of claim 1, in which the change engine adapts a rule functionality in the collaborative space based on the context of the collaboration.

11. The system of claim 1, in which changing an operation of at least one functionality of the collaborative space is based on a request.

12. A system for managing a collaborative space, comprising:
    a monitor engine to monitor content of the collaborative space to determine a context of collaboration in the collaborative space;
    a receive engine to receive context information for the collaborative space; and
    a change engine to change an operation of at least one functionality of the collaborative space based on the received context information.

13. The system of claim 12, further comprising an update engine to update the context of the collaborative space.

14. The system of claim 11, in which changing an operation of at least one functionality of a collaborative space comprises adapting a type ahead functionality, a spell check functionality, a markup functionality, an object reference functionality, a library functionality, a rule functionality, or combinations thereof.

15. A computer program product for managing a collaborative space, the computer program product comprising:
    a computer readable storage medium comprising computer usable program code embodied therewith, the computer usable program code comprising:
       computer usable program code to, when executed by a processor, identify, within the collaborative space, a recipient of a message;
       computer usable program code to, when executed by a processor, obtain recipient context information that, based on information about the recipient, defines a context for communication with that specific recipient; and
       computer usable program code to, when executed by a processor, change an operation of at least one functionality of the collaborative space based on the obtained recipient context information.

16. The computer program product of claim 15, in which the recipient context information comprises group membership, language preference, locality preferences, syntax conventions, or combinations thereof.

17. The computer program product of claim 15, in which obtaining recipient context information comprises gathering recipient context information from a repository.

18. The computer program product of claim 15, in which obtaining the recipient context information comprises inferring recipient context information based on data in a repository.

19. The computer program product of claim 15, in which obtaining the recipient context information comprises receiving input from a client device.

20. The computer program product of claim 15, further comprising computer usable program code to, when executed by the processor, generate a prompt to change at least one functionality of the collaborative space.

* * * * *